US012679186B2

(12) United States Patent
Sviberg et al.

(10) Patent No.: US 12,679,186 B2
(45) Date of Patent: Jul. 14, 2026

(54) MOTOR VEHICLE COMPRISING A ROOF MODULE AND A VEHICLE BODY

(71) Applicant: Webasto SE, Stockdorf (DE)

(72) Inventors: Magnus Sviberg, Stockdorf (DE);
Maximilian Ehrmann, Stockdorf (DE);
Cèdric Langlais, Stockdorf (DE);
Michael Huelsen, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 762 days.

(21) Appl. No.: 18/169,474

(22) Filed: Feb. 15, 2023

(65) Prior Publication Data

US 2023/0256798 A1      Aug. 17, 2023

(30) Foreign Application Priority Data

Feb. 17, 2022      (DE) .......................... 102022103832.7

(51) Int. Cl.
B60J 7/00          (2006.01)
B60J 7/10          (2006.01)
(52) U.S. Cl.
CPC ..................................... B60J 7/10 (2013.01)
(58) Field of Classification Search
CPC ..... B60J 7/00; B60J 7/0023; B60J 7/10; B60J 7/04; B62D 25/06; B62D 29/043; B60S 1/62
USPC ........................................................ 296/215
See application file for complete search history.

(56) References Cited

U.S. PATENT DOCUMENTS

| | | | |
|---|---|---|---|
| 6,423,894 B1* | 7/2002 | Patz ........................... | B60J 7/00 |
| | | | 180/2.2 |
| 2002/0008410 A1* | 1/2002 | Teschner .................... | B60J 7/00 |
| | | | 296/211 |
| 2019/0210436 A1 | 7/2019 | Frederick | |
| 2020/0101905 A1 | 4/2020 | Taylor et al. | |
| 2021/0237694 A1* | 8/2021 | Hirschvogel .............. | B60J 7/16 |
| 2022/0169314 A1* | 6/2022 | Huelsen ............... | B62D 29/043 |

(Continued)

FOREIGN PATENT DOCUMENTS

| | | |
|---|---|---|
| CN | 113199989 A | 8/2021 |
| CN | 113508047 A | 10/2021 |
| DE | 102019126043 A1 | 4/2020 |

(Continued)

OTHER PUBLICATIONS

Office Action issued in corresponding Chinese Application No. 202310146225.7; mailed Jul. 9, 2025; In Chinese with English machine translation (26 pages).

(Continued)

*Primary Examiner* — Steven O Douglas
(74) *Attorney, Agent, or Firm* — Fitch, Even Tabin & Flannery LLP

(57)          ABSTRACT

A motor vehicle having a roof module having a panel component, which at least partially forms a roof skin of a vehicle roof, the roof skin serving as an outer sealing surface of the roof module; and a vehicle body. At least one electrical, electronic and/or electromagnetic component is disposed on the vehicle body, and the roof module comprises at least one functional feature configured to support and/or amplify at least one function of the at least one electrical, electronic and/or electromagnetic component and/or to extend a functional range of the at least one electrical, electronic and/or electromagnetic component.

16 Claims, 1 Drawing Sheet

(56)         References Cited

U.S. PATENT DOCUMENTS

Figure 1:
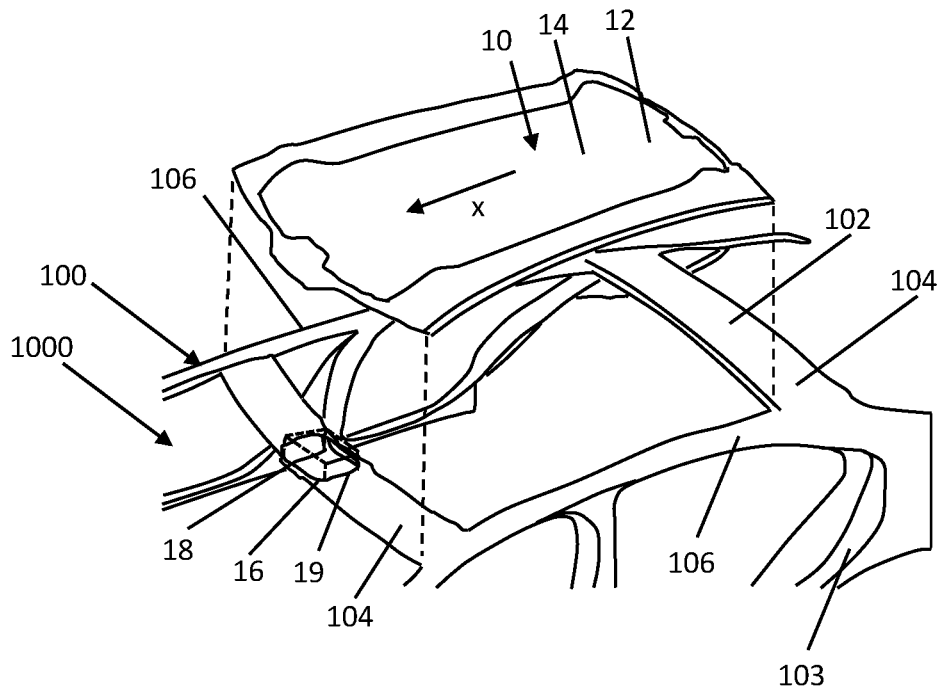

| | | | |
|---|---|---|---|
| 2023/0144240 A1* | 5/2023 | Huelsen | ................ G01S 7/4813 |
| | | | 296/210 |
| 2024/0083391 A1* | 3/2024 | Huelsen | .................... B60S 1/56 |

FOREIGN PATENT DOCUMENTS

| | | | |
|---|---|---|---|
| DE | 102019122230 | A1 | 2/2021 |
| DE | 102019122193 | B4 | 3/2021 |
| DE | 102020102643 | A1 | 8/2021 |
| DE | 102020107759 | A1 | 9/2021 |

OTHER PUBLICATIONS

Office Action issued in corresponding CN Application No. 202310146225.7; date issued: Feb. 2, 2026; in Chinese with English machine translation (17 pages); References cited were previously filed.

* cited by examiner

MOTOR VEHICLE COMPRISING A ROOF MODULE AND A VEHICLE BODY

CROSS-REFERENCE TO RELATED APPLICATION

This application claims priority from German Patent Application Number 10 2022 103 832.7 filed on Feb. 17, 2022, which is hereby incorporated herein by reference in its entirety for all purposes.

FIELD

The invention relates to a motor vehicle comprising a roof module for forming a vehicle roof of the motor vehicle and a vehicle body according to the preamble of claim 1. Furthermore, the invention relates to a roof module according to the preamble of claim 13.

BACKGROUND

Generic motor vehicles are known from the state of the art. A generic roof module, which forms a vehicle roof of the motor vehicle on which it is disposed, is prefabricated as a separate functional module and can be provided directly at the assembly line for the purpose of installation. The roof module at least partially forms a roof skin of the vehicle roof at its outer surface, the roof skin preventing moisture and air flows from entering the vehicle interior. The roof skin is composed of one or more panel components, which can be made of a stable material, such as painted metal or painted or died-through plastic. The roof module can be a part of a fixed vehicle roof or a part of an openable roof sub-assembly.

Furthermore, the development in vehicle manufacturing is increasingly focusing on autonomously and semi-autonomously driving motor vehicles. In order to enable the vehicle controller to control the motor vehicle autonomously or semi-autonomously, a plurality of electrical, electronic and/or electromagnetic components are required, which are installed throughout the motor vehicle. Components of this kind can be environment sensors (e.g., lidar sensors, radar sensors, cameras, multi-cameras etc. including other (electrical) components), for example, which are configured to detect the environment surrounding the motor vehicle and determine, for example, a current traffic situation from the detected environment data.

Furthermore, roof modules comprising a plurality of environment sensors in order to detect the vehicle environment as fully as possible are known from the state of the art. Roof modules of this kind are referred to as roof sensor modules (RSM). The known environment sensors send and/or receive electromagnetic signals, such as laser beams or radar beams, allowing a data model of the vehicle environment to be generated by signal evaluation and to be used for controlling the vehicle.

Various ways of placing environment sensors on roof modules are known from the state of the art. For example, DE 10 2019 122 230 A1 describes environment sensors that are disposed directly on a panel component of the roof module forming the roof skin or the vehicle roof in order to detect and monitor the vehicle environment since the vehicle roof is typically the highest point of a vehicle, from which the vehicle environment is readily visible. From DE 10 2019 122 193 B4, it is known for environment sensors to be disposed on a roof module frame of a roof module, via which the roof module is mounted on a vehicle roof frame of the vehicle body. Furthermore, from DE 10 2020 102 643 A1, it is known for a roof module to be equipped with an environment sensor that is mounted on the roof module in such a manner that it can be moved between an idle position and a use position.

The known options of placing environment sensors or electrical and/or electronic and/or electromagnetic components on roof modules have at least the advantage that installation space has to be provided in each case, which, however, is sparse especially in the roof area. Moreover, new design concepts in vehicle manufacturing increasingly demand the provision of a large panoramic roof for the passenger, which means that the installation space available in the roof area becomes even scarcer. Hence, an increased design flexibility in placing environment sensors or electrical and/or electronic and/or electromagnetic components is desirable overall in vehicle manufacturing.

SUMMARY

Therefore, an object of the invention is to propose a motor vehicle and/or a roof module that avoids the disadvantages of the known state of the art described above and in particular provides a higher degree of design flexibility in the placement of electrical and/or electronic and/or electromagnetic components.

The object is attained by a motor vehicle according to the teaching of claim 1. Furthermore, the object is attained by a roof module according to the teaching of claim 13.

Advantageous embodiments of the invention are the subject matter of the dependent claims. Moreover, any and all combinations of at least two features disclosed in the description, the claims, and/or the figures fall within the scope of the invention. Naturally, the explanations given in connection with the motor vehicle equivalently relate to the roof module according to the invention without being mentioned separately in its context.

According to the first aspect, the motor vehicle according to the invention comprises a roof module having a panel component, which at least partially forms a roof skin of a vehicle roof of the motor vehicle. The roof skin preferably at least partially serves as an outer sealing surface of the roof module. Furthermore, the motor vehicle comprises a vehicle body. The motor vehicle according to the invention is characterized in that at least one electrical, electronic and/or electromagnetic component is disposed on the vehicle body and the roof module comprises at least one functional feature configured to support and/or amplify at least one function of the at least one electrical, electronic and/or electromagnetic component and/or to extend a functional range of the at least one electrical, electronic and/or electromagnetic component.

According to the second aspect, the roof module according to the invention comprises a panel component, which at least partially forms a roof skin of a vehicle roof of the motor vehicle, the roof skin serving as an outer sealing surface of the roof module. The roof module according to the invention is characterized in that it comprises a functional feature having a mechanical and/or electrical and/or electronic and/or electromagnetic interface configured to support and/or amplify at least one function of at least one electrical, electronic and/or electromagnetic component and/or to extend a functional range of the at least one electrical, electronic and/or electromagnetic component, which is disposed on a vehicle body of a motor vehicle, when the roof module is in the installed state.

In other words, the motor vehicle according to the invention is characterized in that the vehicle body comprises the at least one electrical, electronic and/or electromagnetic component. So the at least one electrical, electronic and/or electromagnetic component, such as an environment sensor, is not disposed on a roof module frame of the roof module or on the roof skin of the roof module as in the state of the art; instead, it is disposed on the vehicle body and can thus be installed on the vehicle body independently from the roof module. For example, the vehicle body can be delivered to an assembly line with the at least one component already attached to it. In a subsequent assembly step, the roof module according to the invention can then be installed or mounted on the vehicle body as a structural unit. This increases the flexibility of assembly when manufacturing the motor vehicle. The roof module according to the invention is in particular characterized in that the functional feature is an interface that functionally interacts with the at least one component when the roof module is in the installed state, i.e., when the roof module is disposed on the vehicle roof frame, with the result that the at least one function and/or the functional range of the at least one component is improved, amplified and/or extended. The at least one functional feature of the roof module serves in particular to support and/or extend and/or amplify the at least one function and/or the functional range of the at least one component with the result that the at least one component and the at least one functional feature interact when the roof module is installed on the vehicle body. So, according to the invention, it is possible for at least one of the functions and/or the functional range of the at least one component to be manipulated and/or complemented in such a manner by the functional feature comprised in the roof module that the at least one component exhibits increased performance and/or a longer lifetime and/or an extended functional range, for example. The at least one functional feature can thus be considered a function complementation feature and/or a function amplification feature.

According to the invention, it is particularly preferred for multiple roof modules that are identical in terms of how they are installed to be available for a motor vehicle or a motor vehicle type so that basically any one of these roof modules can be placed on the vehicle body or the vehicle roof frame of the vehicle body as a structural unit. The multiple roof modules preferably differ from each other only in terms of the functional feature comprised therein. In this manner, it is possible for the motor vehicle according to the invention to be equipped with at least one of the multiple roof modules that comprises the required functional feature depending on the application and/or user-specific preference. So the user can preferably choose in which manner they would like to complement and/or extend and/or amplify the at least one function and/or the functional range of the at least one component and select the corresponding roof module according to the invention that has at least the corresponding functional feature, which complements and/or extends and/or amplifies the at least one function selected and/or the functional range of the at least one component, according to their choice. According to the invention, a modular kit comprising the motor vehicle with the vehicle body and at least one roof module according to the invention is provided in this manner. For example, it is also possible for a motor vehicle to be equipped with one of the roof modules according to the invention at a later date, e.g., in the course of a retrofit, if the driver or the user requests a new function and/or an extended functional range of the at least one component, for example.

According to the second aspect of the invention, the functional feature can have at least one mechanical and/or electrical and/or electronic and/or electromagnetic interface. This interface can basically be designed in any manner and can in particular be configured to mechanically and/or electrically and/or electronically and/or electromagnetically interact with the at least one component. The type and the configuration of the interface depend in particular on the function for the at least one component provided by the functional feature and/or the functional range of the at least one component extended by the functional feature. For instance, the interface can comprise one or more mechanical components if the interface is to mechanically and/or thermally couple the functional feature to the at least one component. Alternatively or additionally, the interface can comprise one or more cables and/or a wireless transmission feature if the functional feature is to be electrically and/or electromagnetically coupled to the at least one component.

The expression "at least one" as used herein means that the motor vehicle according to the invention can comprise one or more than one of the component in question. Moreover, it is noted that the expression "at least one electrical, electronic and/or electromagnetic component" is used equivalently to the shortened expression "at least one component" in the description at hand. Of course, multiple electrical, electronic and/or electromagnetic components, in particular functionally different ones, can be disposed on the vehicle body according to embodiments of the invention. Furthermore, the roof module according to embodiments of the invention can of course comprise multiple functional features, which can differ from each other in terms of respective functions provided or complemented, in principle.

Likewise, the motor vehicle according to the invention can of course comprise multiple roof modules, which at least partially form a roof skin of the motor vehicle and/or which are disposed at least in a roof area of the motor vehicle, for example in an area of a longitudinal rail and/or a transverse rail of a vehicle roof frame of the motor vehicle. For example, roof modules of this kind according to the invention may cover only a portion of the vehicle roof. Thus, roof modules of this kind do not form a continuous roof skin or a continuous vehicle roof of the motor vehicle.

The roof module according to the invention can form a structural unit in which features, in particular the at least one functional feature, for autonomous or semi-autonomous driving assisted by driver assistance systems are integrated and which can be placed on a vehicle carcass as a unit by a vehicle manufacturer. Furthermore, the roof module according to the invention can be a purely fixed roof or a roof including a roof opening system. Moreover, the roof module can be configured for use in a passenger car or a utility vehicle.

According to a preferred embodiment, the at least one electrical, electronic and/or electromagnetic component is disposed on the vehicle body directly or indirectly, in particular via a support element. So it is preferably possible for the at least one component to be disposed directly on the vehicle body, i.e., without any other interposed components. Gluing the at least one component to the vehicle body, in particular in a roof area of the vehicle body, such as on a transverse rail or a longitudinal rail of the vehicle body, is an advantageous option for such a direct placement, for example. In principle, however, the at least one component can also be attached to the vehicle body in another manner. The direct placement of the at least one component on the vehicle body has the advantage that no additional components are required, which makes installing the at least one component particularly simple and quick. Alternatively, the at least one component can be disposed on the vehicle body, in particular in a roof area of the vehicle body, such as on a transverse rail or a longitudinal rail of the vehicle body, indirectly via one or more support elements, such as mounting plates and/or mounting components. This manner of disposing the at least one component indirectly has the advantage that this increases the freedom of design in placing the at least one component since the at least one component can be disposed in an installation space in the roof area of the vehicle body in which there is no transverse rail and/or longitudinal rail of the vehicle body available for mounting, for example.

According to a preferred embodiment, the at least one electrical, electronic and/or electromagnetic component is disposed in a roof area of the vehicle body, in particular on a transverse rail and/or a longitudinal rail of a vehicle roof frame and/or on a complete vehicle roof frame, i.e., for example, in a continuous vehicle roof portion, in particular an aluminum roof skin (without a roof frame opening) of the vehicle body.

This embodiment is to define in particular that the at least one component is disposed in an area of the vehicle roof, preferably in an area of the highest point of the vehicle body. In particular, this is supposed to show a distinction from electrical, electronic and/or electromagnetic components that are disposed in other areas of the vehicle body, such as an area of a bumper and/or a trunk and/or a headlight of a motor vehicle. Particularly preferably, the at least one component is disposed on a transverse rail and/or a longitudinal rail of a vehicle roof frame of the vehicle body, which means that it is disposed at the highest position or point of the vehicle body with respect to the vehicle body. When positioned in such a manner, the at least one component has a comprehensive receiving radius and/or transmitting radius into the vehicle environment.

According to a preferred embodiment, the at least one functional feature is disposed on the panel component of the roof module. According to this embodiment, the roof module does not necessarily have to comprise a roof module frame. The roof module may merely comprise a panel component which at least partially defines a roof skin of the motor vehicle; i.e., the panel component does not necessarily form the entire vehicle roof of the motor vehicle. According to this embodiment, the functional feature is preferably disposed directly on the panel component or is at least partially formed by the panel component or is disposed on the panel component indirectly via one or more interposed mounting components, for example. The functional feature can basically be attached to the panel component by different ways of attachment, such as gluing, welding, soldering, screwing, bolting and/or riveting. For example, the functional feature can also be at least partially formed by the panel component; this can be the case, for example, if the functional feature comprises a cooling feature having at least one cooling channel. Such a cooling channel can be provided by designing or shaping the panel component accordingly, for example.

According to a preferred embodiment, the roof module comprises a roof module frame, via which the roof module is attached to the vehicle body, in particular as a structural unit. The at least one functional feature is disposed in particular directly or indirectly on roof module frame, integrated in the latter and/or at least partially formed by the latter. Of course, additional functional features can also be disposed on the roof module frame and/or the panel component of the roof module, in principle. So the roof module according to an embodiment of the invention can comprise multiple functional features, which preferably provide multiple functions, in particular different functions, for the at least one component and/or extend its functional range. According to this embodiment, the at least one functional feature can be integrated in the roof module frame, for example. This means that the functional feature can be formed by part of the roof module frame, for example. For instance, the functional feature can comprise a cooling feature having at least one cooling channel formed by at least one part of the roof module frame, in particular a rail of the roof module frame, with a hollow cross section. So the functional feature is preferably formed at least partially by the roof module frame. It can also be preferred for at least part of the at least one electrical and/or electronic and/or electromagnetic component to be disposed directly or indirectly on the panel component.

According to a preferred embodiment, the at least one electrical, electronic and/or electromagnetic component has a housing, through which it is directly or indirectly disposed on, in particular mounted on, welded to, glued to and/or screwed to, the vehicle body. Such a housing is advantageous if the at least one component is to be disposed on the vehicle body in such a manner that it is protected from moisture, in particular in a moisture-proof manner, for example. For example, the housing can comprise at least one mounting surface, through which the housing is configured to be disposed on the vehicle body, in particular on a transverse rail and/or a longitudinal rail of the vehicle roof frame of the vehicle body. In principle, it is possible for multiple electrical and/or electronic and/or electromagnetic components to be disposed in a common housing or in separate housings. For example, the at least one housing can also form part of an interface through which the at least one component can interact with the functional feature disposed on the roof module. For example, the at least one housing can provide a heat transfer surface on a housing portion, through which waste heat of the at least one component can be transferred to the functional feature, which preferably comprises a cooling feature.

According to a preferred embodiment, the at least one electrical, electronic and/or electromagnetic component comprises an antenna and/or a measuring sensor and/or a communication device and/or an illumination device and/or an environment sensor, in particular a lidar sensor and/or a radar sensor and/or a camera sensor and/or a multi-camera sensor and/or an ultrasonic sensor. Of course, the component can also comprise several of said components in each case. The antenna can be an electrical or magnetic antenna. The measuring sensor can be a temperature sensor, a humidity sensor, a GPS sensor, an acceleration sensor and/or a similar measuring sensor, for example. The communication device can be a WLAN interface, an LTE interface or another type of short-, medium- or long-range communication interface. The communication device enables the motor vehicle to communicate with a vehicle environment and in particular to send and/or receive data. The illumination device can comprise one or more than one light. The lights are in particular configured to indicate a (semi-)autonomous driving mode and/or different driving mode situations of the motor vehicle. The environment sensor according to the invention can basically be configured in various ways and comprise a lidar sensor, a radar sensor, an optical sensor, such as a camera or a multi-camera, an ultrasonic sensor and/or the like. Lidar sensors, for example, operate in a wavelength range of 905 nm or about 1550 nm. A material in a see-through area of the environment sensor is preferably transparent to a wavelength range used by the environment sensor and selected as a function of the wavelength(s) used by the environment sensor. Of course, merely a signal detection unit, such as an optical sensor and/or a photo chip, may be disposed on the vehicle body. Evaluation electronics, which are in particular referred to as a camera control unit (CCU) and which are configured to evaluate the signals detected by the optical sensor, can be disposed separately in another area of the motor vehicle.

According to a preferred embodiment, the at least one functional feature comprises at least one other electrical, electronic and/or electromagnetic component configured to complement and/or amplify and/or extend the functional range of the at least one electrical, electronic and/or electromagnetic component. It is noted that the explanations regarding the at least one component in the paragraph above equally apply to the at least one other component without being redundantly mentioned in its context. The at least one other component can amplify and/or improve and/or extend a function, such as a transmission power and/or a reception quality, a resolution or the like, of the at least one component disposed on the vehicle body, for example. The other component can be a measuring amplifier, for example, which can amplify a measuring function of the at least one component of the vehicle body. In principle, it is also possible that at least the at least one other component is disposed directly or indirectly on the panel component.

According to a preferred embodiment, the at least one functional feature comprises at least one cleaning feature and/or a temperature-control feature (i.e., a cooling feature and/or a heating feature) and/or a control feature and/or an amplifying feature and/or an optical feature and/or a communication interface and/or an energy generation feature and/or an energy storage feature.

A preferred cleaning feature of this kind preferably comprises at least one cleaning nozzle for cleaning a see-through area through which the at least one component, in particular a measuring sensor and/or an environment sensor, looks, and/or at least one wiper for cleaning a see-through area through which the at least one component, in particular a measuring sensor and/or an environment sensor, looks, and/or one or more connecting lines for supplying a cleaning fluid. The cleaning feature is preferably connected to a tank, which can be disposed anywhere in the motor vehicle. The cleaning fluid can be a liquid, a gas and/or pressurized air. The cleaning feature is configured to clean a see-through area through which the at least one component, in particular a measuring sensor and/or an environment sensor, looks. This supports or improves the function of the at least one component since the at least one component, which is in particular an environment sensor and/or a measuring sensor, can be operated without disruption as dirt is effectively removed from the see-through area.

A temperature-control feature of this kind preferably comprises at least one heat-conducting channel or a cooling channel (see descriptions above) and/or a heat transfer element and/or at least one fan and/or at least one heat exchanger and/or at least one heat-conducting pipe (also referred to as a heat pipe). The temperature-control feature is configured to air-condition or control the temperature of the at least one component (i.e., to keep it at a predetermined (operating) temperature). In order to provide this additional temperature-control function for the at least one component, the temperature-control feature is preferably connected to the at least one component via at least one heat-conducting interface when the roof module is disposed on the vehicle body. This provides a temperature-control function of the at least one component that ensures the reliability of the at least one component during operation and in particular prevents the at least one component from overheating. The temperature-control feature preferably keeps the at least one component at a predetermined operating temperature.

A control feature of this kind can preferably control one or more functions of the at least one component. In particular, the control feature can execute software by means of a processor, for example, the software controlling one or more than one function of the at least one component. For example, the control feature can also receive software updates via a communication interface of the motor vehicle (see also the explanations above), for example, so that a functional range of the at least one component can be extended by such a software update. The control feature can also extend a functional range of the at least one component by providing extended control functions that cannot be executed by a controller of the component itself. The control feature preferably allows a functional range of the at least one component to be extended in the course of a retrofit.

An amplifying feature of this kind can preferably be configured to amplify a transmission power and/or a reception quality of the at least one component and thus improve the performance of the at least one component. The amplifying feature can comprise a signal amplifier or the like, for example.

An optical feature of this kind can comprise a see-through area in the form of a window and/or a lens and/or another optical element, for example. The optical feature is preferably configured to provide a see-through area for the at least one component, which is in particular an environment sensor and/or measuring sensor, through which the at least one component can look in order to receive electromagnetic and/or optical signals from a vehicle environment and/or send electromagnetic and/or optical signals into the vehicle environment. The optical feature can be configured to extend a field of view or an angle of view of the at least one component and/or to limit the latter to a predetermined detection area. This can be provided by a lens or a similar optical element, for example. In the simplest case, the optical feature can comprise a window through which the at least one component can look. In such a case, it is preferred for the at least one component and/or a housing in which the at least one component is disposed to not comprise a see-through area so as to ensure that the at least one component looks through a single window or a single see-through area in order to detect the vehicle surroundings. In this manner, it is possible to reduce detection losses that occur when sent and/or received electromagnetic signals pass through the see-through area even though the latter is transparent to predetermined wavelength ranges.

A communication interface of this kind can preferably be configured to receive data from outside the motor vehicle and/or send data to vehicle surroundings. For example, the communication interface can be configured to communicate with a server or a cloud, from which data can be retrieved and/or on which data can be stored. For example, the communication interface can be a WLAN interface and/or a radio interface and/or a GPS interface and/or a Bluetooth interface.

An energy generation feature of this kind can, for example, be configured to generate electrical energy required for operating the at least one component or convert another form of energy (e.g., solar energy) into electrical energy. For example, the energy generation feature can comprise at least one photovoltaic cell, which can convert solar energy into electrical energy. The energy generation feature preferably comprises power electronics and/or a DC/DC converter and/or an AC/DC converter. Thus, a required voltage level or power level can preferably be provided in a component-specific manner. The energy generation feature is preferably disposed in a roof area of the panel component. For example, the energy generation feature allows energy required for the electrical system of the vehicle and/or the at least one component to be provided, which means that an energy storage (e.g., a traction battery) is relieved, the motor vehicle thus having a greater range.

An energy storage feature of this kind can be a battery and/or super capacitor. Thus, it is possible for energy generated by the preferred energy generation feature to be temporarily stored in order to supply the at least one component with energy even when the energy generation feature is unable to generate energy, for example. It is basically also possible that the roof module merely comprises a battery management system as a functional feature and other parts of the energy storage feature, such as the battery cells and/or the super capacitors, are located in other areas of the motor vehicle.

According to a preferred embodiment, the at least one functional feature comprises a mechanical and/or electrical and/or electronic and/or electromagnetic interface configured to interact with the at least one electrical, electronic and/or electromagnetic component when the roof module is disposed on the vehicle body, in particular mounted on and/or glued to and/or attached to the vehicle roof frame of the vehicle body. Such an interface makes it possible to connect the functional feature to the at least one component. In this way, the at least one function of the at least one component can be supported and/or amplified and/or a functional range of the at least one component can be extended. The specific configuration of the interface depends on the function provided by the functional feature. For instance, the interface can make it possible for the at least one component to be connected to the functional feature in order to effectively discharge waste heat generated by the at least one component, for example. The interface can also comprise one or more than one cable in order to electrically connect the at least one component to the functional feature. The interface can also comprise a wireless interface that allows the at least one component to communicate and/or interact with the functional feature. Particularly preferably, the interface is configured to provide an in particular bidirectional data transfer between the at least one component and the interface.

According to a preferred embodiment, the roof module is disposed on a vehicle roof frame of the vehicle body as a structural unit. The roof module can preferably be glued, screwed and/or welded to the vehicle roof frame. The roof module can have a roof module frame or be disposed on the vehicle roof frame or on top of the vehicle roof frame via the panel component, i.e., without a roof module frame.

Of course, the embodiments and the illustrative examples mentioned above and yet to be discussed below can be realized not only individually but also in any combination with each other without departing from the scope of the present invention. Moreover, the embodiments and the illustrative examples mentioned above and yet to be discussed below equivalently or at least similarly relate to the roof module according to the invention without being separately mentioned in its context.

BRIEF DESCRIPTIONS OF THE DRAWINGS

An embodiment of the invention is schematically illustrated in the drawing and will be discussed as an example below.

10

Figure 2:
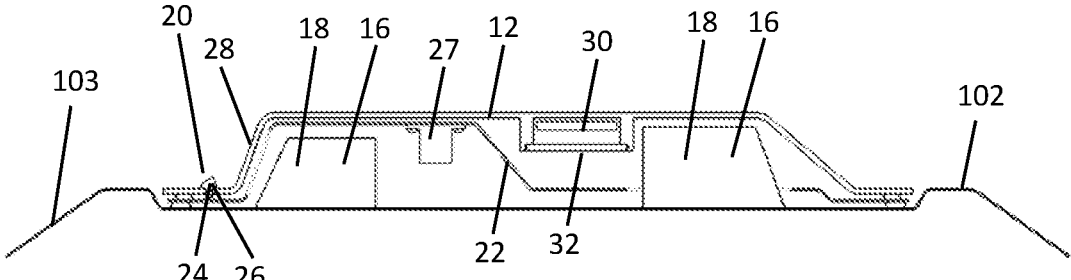

FIG. 1 is a schematic view of a motor vehicle having a vehicle body and a roof module; and FIG. 2 is a schematic sectional view of a roof area of a motor vehicle having a roof module, the cut running parallel to a longitudinal vehicle direction.

DETAILED DESCRIPTION

FIG. 1 shows a motor vehicle 1000 having a vehicle roof 100. In the case at hand, vehicle roof 100 is formed by a roof module 10. Roof module 10 can be placed on a vehicle roof frame 102 of a vehicle body 103 as a structural unit. This fact is schematically indicated in the form of dashed lines in the case at hand. Roof module 10 comprises a panel component 12 for forming a roof skin 14 of vehicle roof 100. In a front center roof area of vehicle body 103 when viewed in a longitudinal vehicle direction x, an electric and/or electronic and/or electromagnetic component 16 is disposed on a front transverse rail 104 of vehicle roof frame 102. Front transverse rail 104 forms a header of the roof of motor vehicle 1000. In the case at hand, electrical and/or electronic and/or electromagnetic component 16 is disposed directly on front transverse rail 104. Front transverse rail 104 and rear transverse rail 104 and two longitudinal rails 106 together form vehicle roof frame 102.

Electrical and/or electronic and/or electromagnetic component 16 comprises an environment sensor 18, which is a lidar sensor in the case at hand. Other sensor types, such as (multidirectional) cameras and/or ultrasonic sensors, can be employed, as well. Furthermore, electrical and/or electronic and/or electromagnetic component 16 comprises a housing 19, in which at least part of environment sensor 18 is disposed (in this case entirely and in a moisture-proof manner) in the case at hand. The sensor housing is glued directly onto front transverse rail 104 in the case at hand. However, housing 19 can also be a partial housing or a housing portion. Environment sensor 18 is configured to send and/or receive electromagnetic signals in order to detect vehicle surroundings of motor vehicle 1000 in this manner (e.g., for autonomous driving or parking).

FIG. 2 shows a second illustrative example of the motor vehicle 1000 according to the invention and of the roof module 10 according to the invention. FIG. 2 shows a sectional view of a roof area of motor vehicle 1000, the cut being placed parallel to longitudinal vehicle direction x. According to the second illustrative example, two electrical, electronic and/or electromagnetic components 16 are disposed on vehicle body 103. Both components 16 are directly disposed on, i.e., glued to, vehicle body 103 in the case at hand. The two components 16 are environment sensors 18.

In the case at hand, roof module 10 comprises at least one functional feature 20, which is configured to support and/or amplify at least one function of the at least one electrical, electronic and/or electromagnetic component 16 and/or extend a functional range of the at least one electrical, electronic and/or electromagnetic component 16. In the case at hand, functional feature 20 comprises multiple technical components. Furthermore, roof module 10 according to this illustrative example comprises a roof module frame 22, via which roof module 10 is mounted on, in particular glued to, vehicle roof frame 102 in the case at hand.

In the case at hand, the at least one functional feature 20 comprises a cleaning feature 24, which comprises at least one cleaning nozzle 26 and a valve 27. Cleaning nozzle 26 is disposed on panel component 12 of roof module 10, in particular inserted through an opening of panel component 12. Valve 27 is disposed on roof module frame 22. Furthermore, functional feature 20 comprises a see-through area 28, through which one of the two environment sensors 18 (the left environment sensor 18 in FIG. 2) can detect vehicle surroundings in the form of electromagnetic signals. See-through area 28 is transparent to a wavelength range of left environment sensor 18 in FIG. 2. Roof module frame 22 is preferably cut out in the area of see-through area 28, thus enabling environment sensor 18 to detect the vehicle surroundings unhindered through roof module frame 22. Cleaning nozzle 26 is configured to clean see-through area 28. This can take place by means of a cleaning fluid, in particular a liquid or a cleaning gas. Furthermore, functional feature 20 comprises a communication interface 30, which is an antenna in the case at hand. In other illustrative examples, roof module 10 can also comprise another electrical, electronic and/or electromagnetic component 32, which is configured to complement and/or amplify and/or extend the functional range of the at least one electrical, electronic and/or electromagnetic component 16. This component 32 can also be an antenna, for example. For this reason, the reference sign for such another component 32 has also been added to FIG. 2. Communication interface 30 or other component 32 is disposed on roof module frame 22 in the case at hand.

The invention claimed is:

1. A motor vehicle comprising:
a vehicle body having disposed thereon at least one of an electrical, an electronic and an electro-magnetic component,
a roof module having a panel component, which at least partially forms a roof skin of a vehicle roof, the roof skin serving as an outer sealing surface of the roof module;
wherein the roof module comprises at least one functional feature configured to at least one of support and amplify at least one function of the at least one electrical, electronic and electro-magnetic component and at least one of to extend a functional range of the at least one electrical, electronic and electromagnetic component;
wherein the motor vehicle is configured to be equipped or retrofitted with a pre-selected roof module configuration that comprises the required functional feature or features depending on a pre-configured application or a user-specific preference.

2. The motor vehicle according to claim 1, wherein the at least one electrical, electronic and electromagnetic component is disposed on the vehicle body directly or indirectly.

3. The motor vehicle according to claim 1, wherein the at least one electrical, electronic and electromagnetic component is disposed in at least one of a roof area of the vehicle body on a transverse rail, a longitudinal rail of a vehicle roof frame, and on a complete vehicle roof frame of the vehicle body.

4. The motor vehicle according to claim 1, wherein the at least one functional feature is disposed on the panel component of the roof module directly or indirectly.

5. The motor vehicle according to claim 1, wherein the roof module comprises a roof module frame, via which the roof module is attached to the vehicle body, and the at least one functional feature is at least one of disposed on, integrated in and at least partially formed by the roof module frame.

6. The motor vehicle according to claim 1, wherein the at least one electrical, electronic and electromagnetic component has a housing, via which it is directly or indirectly disposed.

7. The motor vehicle according to claim 1, wherein the at least one electrical, electronic and electromagnetic component comprises an antenna and/or a measuring sensor and/or a communication device and/or an illumination device.

8. The motor vehicle according to claim 1, wherein the at least one electrical, electronic and electromagnetic component comprises an environment sensor.

9. The motor vehicle according to claim 1, wherein the at least one functional feature comprises at least one other electrical, electronic and electromagnetic component configured to at least one of complement, amplify and extend the functional range of the at least one electrical, electronic and electromagnetic component.

10. The motor vehicle according to claim 1, wherein the at least one functional feature comprises at least one of a cleaning feature, a temperature-control feature, a control feature, an amplifying feature, an optical feature, a communication interface, an energy generation feature, and an energy storage feature.

11. The motor vehicle according to claim 1, wherein the at least one functional feature which comprises one of a mechanical, an electrical, an electronic, and an electromagnetic interface configured to interact with the at least one electrical, electronic and electromagnetic component when the roof module is disposed on the vehicle body.

12. The motor vehicle according to claim 1, wherein the roof module is disposed on a vehicle roof frame of the vehicle body as a structural unit.

13. A roof module comprising,
a panel component, which at least partially forms a roof skin of a vehicle roof, the roof skin serving as an outer sealing surface of the roof module,
wherein the roof module comprises a functional feature having at least one of a mechanical, an electrical, an electronic, and an electromagnetic interface configured to support and/or amplify at least one function of at least one electrical, electronic and electromagnetic component and/or to extend a functional range of the at least one electrical, electronic and electromagnetic component, which is selected and installed on a vehicle body of a motor vehicle, when the roof module is in the installed state;
wherein the motor vehicle is configured to be equipped or retrofitted with a pre-selected roof module configuration that comprises the required functional feature or features depending on a pre-configured application or a user-specific preference.

14. The motor vehicle according to claim 2, wherein the at least one electrical, electronic and electromagnetic component is directly or indirectly disposed on the vehicle body via a support element.

15. The motor vehicle according to claim 6, wherein the at least one electrical, electronic and electromagnetic component has a housing, via which it is directly or indirectly disposed on by at least one of being mounted on, welded to, glued to and screwed to, the vehicle body.

16. The motor vehicle according to claim 8, wherein the environment sensor is at least one of a lidar sensor, a radar sensor, a camera sensor, a multi-camera sensor, and an ultrasonic sensor.

* * * * *